INVENTOR.
HOWARD R. HEATH
BY
ATTORNEY.

Sept. 8, 1953          H. R. HEATH          2,651,751
APPARATUS FOR MEASURING RESISTANCE Filed Dec. 14, 1949          3 Sheets-Sheet 3

INVENTOR.
HOWARD R. HEATH
BY
Roland A. Anderson
ATTORNEY.

Patented Sept. 8, 1953

2,651,751

UNITED STATES PATENT OFFICE 2,651,751

APPARATUS FOR MEASURING RESISTANCE

Howard R. Heath, Berkeley, Calif., assignor to the United States of America as represented by the United States Atomic Energy Commission Application December 14, 1949, Serial No. 132,924

7 Claims. (Cl. 324—30)

This invention relates generally to the measurement of electrical resistance and more particularly to the measurement of the resistance of electrolyte materials requiring the observance of special precautions during the measuring operations. One example of a usage for which the invention is well adapted is in the measuring of the variations in resistance of human blood in the study of blood coagulation. It has been previously observed that blood resistance measurements offer a useful criterion for determining blood clotting times and rates of clot retraction, and that knowledge of such factors have medical significance in the study of disease or of radiation exposure.

Various workers in the medical arts have previously recognized the need for accurate and rapid measuring of the electric resistance of blood samples and several papers have been presented thereon as indicated in the bibliography portion of the article by Rosenthal and Tobias, entitled "Measurement of the Electric Resistance of Human Blood," vol. 33, No. 9, pages 1110–1122, September 1948, Journal of Laboratory and Clinical Medicine. However, so far as known, each of the previous investigators has been compelled to employ certain time consuming steps of manually adjusting the resistance measuring apparatus, as for example, a Wheatstone bridge circuit and null indicating means, with the result that rough approximations only of the exact times when the resistances of a plurality of samples begin to change were obtainable.

It is an object of the present invention therefore, to provide an improved method and apparatus for rapidly and automatically measuring the electrical resistances of electrolytes.

A second object is to provide an improved method and apparatus for maintaining standard conditions upon an electrolyte of variable resistance in order that the resistance thereof may be directly reflected at a recording stage of operation in terms of electrical potential.

Another object is to provide an improved method and means for selectively measuring the electrical resistance of a plurality of electrolyte samples of biological origin.

Other objects and advantages of the invention will become more apparent when considered in conjunction with the following description and accompanying drawings, in which.

Figure 1:
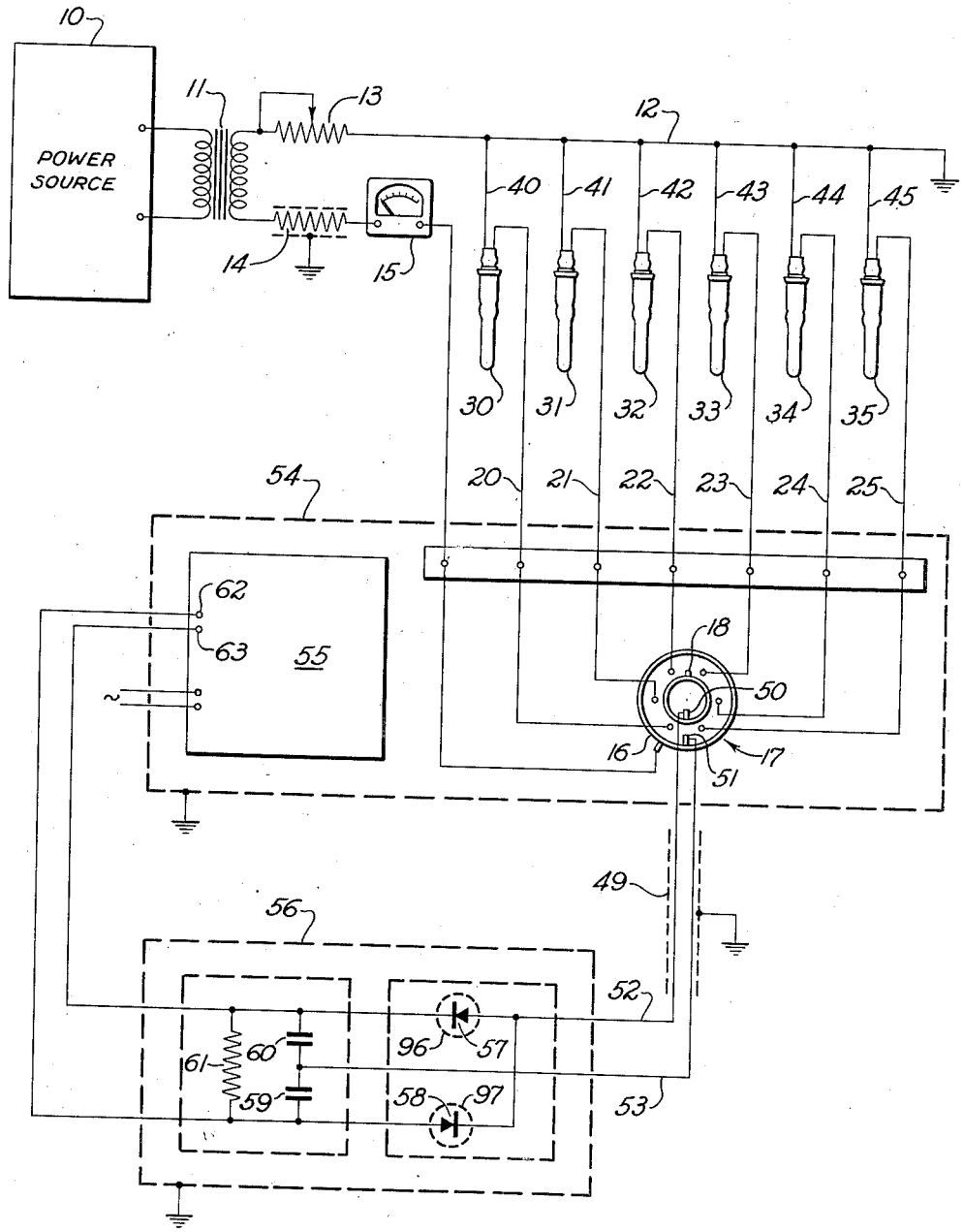
Figure 1 is a diagrammatic view of a circuit in which a plurality of electrolyte samples are arranged in parallel for measurement in sequence.

Referring now to Fig. 1, a preferred arrangement for applying current to a plurality of samples of electrolytes of biological origin may include an alternating current power source 10, such as a conventional audiofrequency oscillator capable of providing a current flow at desired voltage and frequency. As will be more fully explained hereinafter, the derivation of acceptable values of changes in such electrolyte resistance depends in large part upon the flow therethrough during measurement of its resistance of a substantially constant current which has no polarizing effect and no appreciable heating effect upon the sample. In order to eliminate any variables due to a polarizing action, the use of alternating current is essential and experience has shown that the frequency used should be greater than the usual sixty cycles of a distribution outlet. In one case in which satisfactory readings were secured, a frequency of 1000 cycles was used although a wide frequency band preferably should be available and the power source 10 conveniently may be rated at a range of 200 to 200,000 cycles per second with an accuracy of about plus or minus 2%. In the testing of blood samples, operation at a predetermined frequency within the range of 1000 to 2000 cycles per second is preferred.

Figure 3:
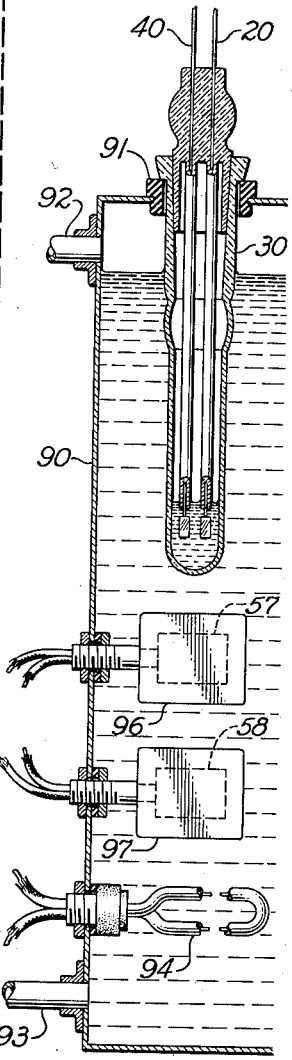
Fig. 3 is a view partly in section showing one arrangement for mounting the electrolyte containers and a portion of the rectifier means within a structure adapted to maintain a constant temperature, a single electrolyte sample being shown therein.

Power source 10 feeds into an impedance matching transformer 11 having one terminal of its secondary connected to a lead 12 through a variable resistor 13 and with the other terminal connected through a fixed resistance 14 and milliammeter 15 to a rotatable ring terminal 16 of a conventional automatic switching means 17. Another ring terminal of the switch, having a projecting contact 18, is adapted to rotate as by a motor drive into successive contact with a series of terminal posts and a connection may thus be made as desired through any of conductors 20, 21, 22, 23, 24 and 25 leading from the respective terminal posts to a first electrode disposed in the electrolyte under measurement in one of the test tubes 30, 31, 32, 33, 34 and 35, respectively. Connections 40, 41, 42, 43, 44 and 45, respectively serve to connect a second electrode disposed in said test tubes to the lead 12. For the purpose of maintaining a standard temperature condition upon each electrolyte sample, each of the test tubes preferably is immersed in a suitable temperature controlling bath, such as shown in Fig. 3 in connection with the illustrative test tube 30. Experience has shown that a change of only 1° C. in the temperature of a human blood electrolyte may cause a change of about 2.5 percent in its electrical resistance.

In addition to the necessity for eliminating resistance changes due to temperature fluctuations, a substantially constant value of current flow also is required since it has been found that any substantial fluctuation in current flow through a sample during measurement might result in erroneous interpretations. Accordingly, the fixed resistance 14, which preferably is provided with a grounded shield, has a resistance which is comparatively very large with respect to the resistance of any one sample. For example, it should be at least as much as 100 times and may be as much as 1500 times as large as the resistance of any single sample being measured. In one satisfactory arrangement, a resistance 14 having a value of 75,000 ohms has been employed while the amount of current passing through the circuit was in the order of 370 microamperes. In any event, in order to avoid a detrimental heating effect when electrolytes of biological origin are being tested the maximum value of current flow should not be greater than 1.0 milliampere.

By means of the foregoing embodiment of the invention it will be noted that rapid and periodic measurements of the resistance values of the samples in the several test tubes may be taken by measuring the value of the alternating current voltage drop resulting from the substantially constant flow of current through the sample. Operation of switch 17 imposes upon the brushes 50 and 51 thereof an alternating current potential difference which may be led through conductors 52 and 53 to any suitable means for converting the same into a direct current voltage difference which then may be applied to an automatic measuring and recording means employed at the recording stage of the process for production of a permanent record of measurements. One such automatic measuring and recording means, which generally is adaptable for this purpose, is that marketed under the designation Speedomax Type G Instruments and described in Catalogue N. D. 46(1) 1949 of the Leeds and Northrup Company, Philadelphia, Pennsylvania. This instrument is indicated generally at 54 and is adapted to receive a direct current voltage and may incorporate the switch means 17 as a part thereof. For the purpose, however, of supplying a direct current voltage to the conventional recording portion 55 of the instrument, a separate conversion unit 56 is provided as a novel portion of my invention.

Conductor 52 is adapted to lead to one side of crystal rectifier 57 while a connection from this same conductor leads to one side of a similar crystal rectifier 58, both such rectifier crystals being encased in suitable submersible containers 96 and 97, respectively. From the opposite sides of said rectifiers suitable conductors lead to the outer terminals of a pair of capacitors 59 and 60 and thence to the input terminals 62 and 63 of recording unit 55. Conductor 53 meanwhile leads to a point intermediate said capacitors and preferably both conductors 52 and 53 are associated with a grounded shield 49 serving to reduce stray capacitance.

The rectifier crystals, which preferably are of germanium, are arranged such that when crystal 57 is made positive the upper side of capacitor 60 is positively charged and when the crystal 58 is made positive the upper side of capacitor 59 is positively charged.

Since capacitors 59 and 60 are connected in series the direct current voltages across the capacitors are additive and are applied across a suitable load resistor 61 serving as a discharge path. The effect therefore is to substantially double the voltage existing across conductors 52 and 53 and to apply a direct voltage of sufficient value to terminals 62 and 63 of unit 55 to enable it to function in its conventional manner.

Figure 4:
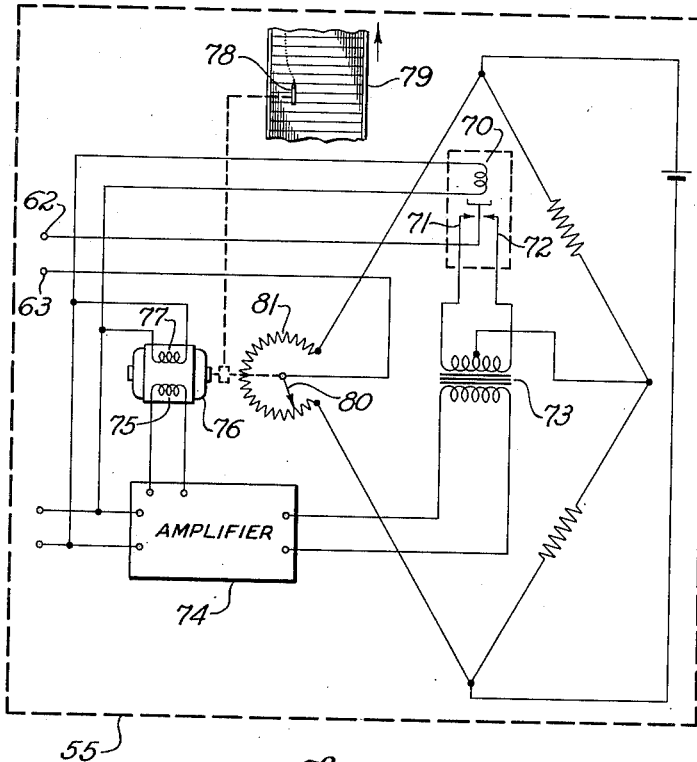
Fig. 4 is a diagrammatic view of a circuit of a conventional recording means adapted for use in connection with the present invention.

Referring now to Fig. 4, a diagrammatic circuit diagram of the chief components of the aforementioned recording unit is shown.

Figure 5:
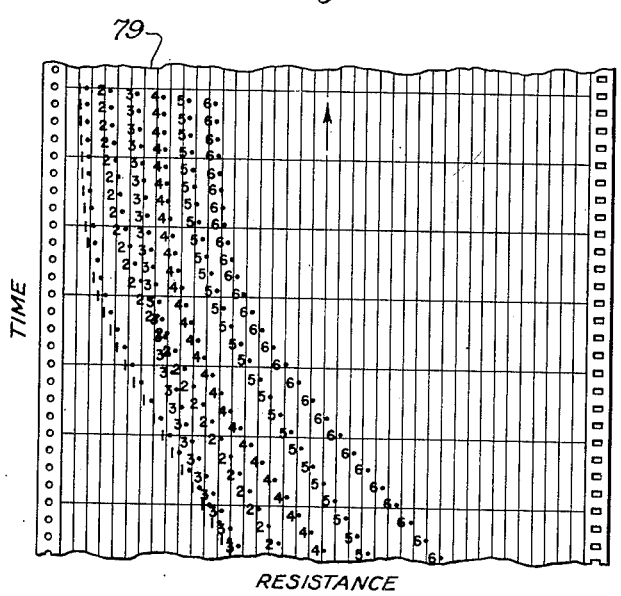
Fig. 5 is a view of a portion of a conventional recording chart, such as employed with the circuit shown in Fig. 4 when carrying out the present invention.

Direct current voltage terminal 62 is connected to a converter 70 so that upon change in the voltage at that terminal (representing in this case a change of resistance of a sample of electrolyte) a contact 71 or 72 is closed, thereby connecting an unbalanced potential across the primary winding of the amplifier input transformer 73. As a result, an alternating voltage is induced in the transformer secondary. This alternating current is carried to amplifier 74 where vacuum tubes amplify it and energize the control winding 75 of the two-phase balancing motor 76. Inasmuch as the other winding, namely, the line winding 77, of the motor is permanently connected to the power supply, this energizing of the control winding instantly starts the motor. Connected to the shaft of motor 76 is a means for moving a recording pen 78 along a movable chart 79 and also a movable contact 80 adapted to move along a voltage dividing slidewire 81 and connected to direct current voltage input terminal 63. When the position of contact 80 selects a direct current potential corresponding to the direct current voltage reflecting the resistance of the electrolyte under measurement, there no longer is any potential difference at converter contacts 71 and 72 and the amplifier output becomes zero. Hence no driving voltage is applied to the control winding of the balancing motor and it thereupon ceases to move. The circuit hence remains in balance until another resistance measurement of an electrolyte occurs. As shown in Fig. 5, a conventional chart 79 on which resistance measurements are plotted automatically with respect to time may thus be made by operation of the recorder 55. For example, the series of dots 1 may represent the succesive resistance readings of the electrolyte in test tube 30, and the series of dots 2, 3, 4, 5, and 6 may represent respectively the resistances of the samples in test tubes 31, 32, 33, 34 and 35. As an example, a control or a specially treated sample, such as indicated at 3, and corresponding to the contents of test tube 32, may be used to provide a contrast with the other samples, if desired.

In the measurement of samples of blood, it is important that a standard temperature be maintained upon such sample. One suitable means which may be used is shown in Fig. 3, and may comprise an enclosure 90 provided with an apertured sealing means 91 in which one or more test tubes, such as the tube 30, may be securely held, without being subjected to vibration. Enclosure 90 may contain a bath of suitable liquid which may enter through inlet 92 and leave through outlet 93 and may be kept at a fixed temperature as by heating means 94. As a convenient means for insuring constant temperature conditions, and hence constant electrical characteristics, of the rectifier crystals 57 and 58 their separate containers 96 and 97 may be immersed within the bath at a suitable location. Conventional seals for the leads from containers 96 and 97 and from the heating means 94, which is here shown as an electrical heating coil, may be provided in the enclosure wall.

Although an equivalent rectifier means, such as a suitable vacuum tube, could be used in certain cases, without requiring a special temperature control therefor, I prefer the use of crystals, such as germanium, due to their sensitivity and their excellent frequency response when used at frequencies even as high as three megacycles. Moreover, by using a plurality of crystals in the manner disclosed a doubling of the direct current voltage for application to the recording circuit can easily be accomplished. Since minute and feeble currents are employed in the measurement of the electrolyte resistances, especially when samples of human blood are being tested for blood clotting characteristics, it will be apparent that the voltage doubling arrangement is of material benefit in connection with the recording phase of the process.

The parallel arrangement of the several test tubes in the circuit shown in Fig. 1 allows only intermittent current flow through a given sample and insures a minimum of heating due to such current flow. Moreover, it has the advantage of permitting each cell to be grounded and thus avoids the likelihood of stray capacitance exerting any influence upon the current flow. Furthermore, the conductors 52 and 53 preferably are shielded and the shield therefore is grounded. Also, the current flow through the system may readily be changed by a simple manipulation of the variable resistor 13, as when it is necessary to adjust for changes in the oscillator output or to arrange a current value intermediate that provided by certain taps on the oscillator.

Figure 2:
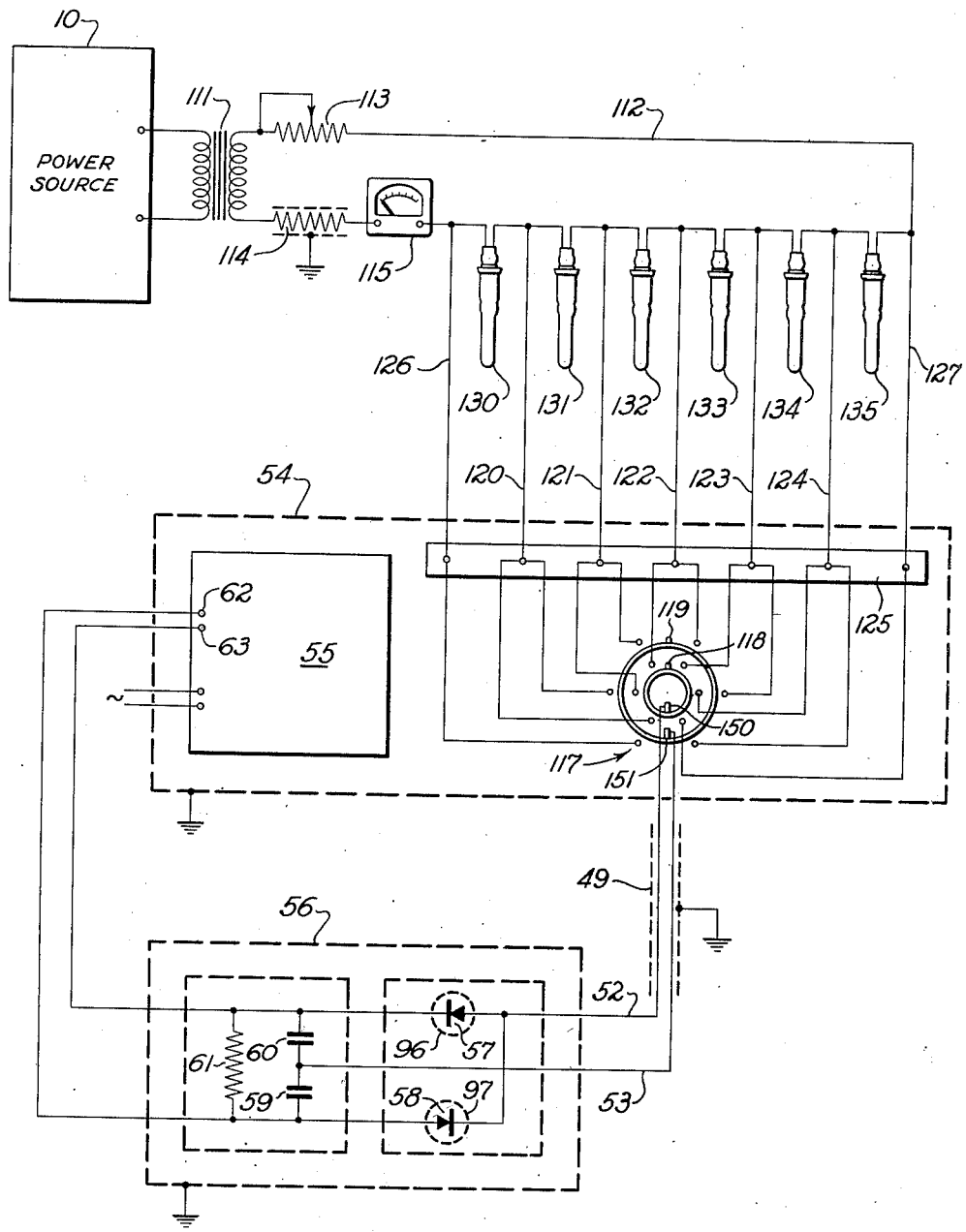
Fig. 2 is a diagrammatic view of a circuit in which a plurality of electrolyte samples are arranged in series for measurement in sequence.

When the above considerations are of secondary importance, however, as in the testing of certain types of electrolytes permitting greater fluctuations in current flow, a series flow of current constantly through the plurality of samples may be employed, as shown in Fig. 2, without departing from the invention. Using the same power source 10, the secondary of a transformer 111 may lead through a fixed resistor 114, milliammeter 115 and each of test tubes 130, 131, 132, 133, 134, and 135 in series to a return line 112 including the variable resistor 113. A modified switch means 117 is provided with rotatable ring terminals having projecting contacts 118 and 119 which upon rotation as a unit establish a connection between a series of fixed outer contacts and a series of fixed inner contacts whereby the alternating current voltage across a selected test tube may be transmitted through the brushes 150 and 151 and thence through conductors 52 and 53 to the rectifier crystals 57 and 58, in the same manner as disclosed by Fig. 1. As will be noted, common leads 120, 121, 122, 123 and 124 may be used between adjacent test tubes and be connected to a terminal strip 125 from which short dual leads extend to the series of inner and outer contact points, a given common lead thus extending to contact points successively displaced one from the other. Terminal leads 126 and 127 also are provided to establish connections across the outermost test tubes 130 and 135.

Having thus described the general purpose of the invention and two arrangements for carrying out the process thereof, reference again is made to Fig. 1, wherein the parallel connections are employed. Having the samples of electrolyte in place and the equipment adjusted to predetermined values of current flow, the equipment is energized and automatic switch 17 begins to rotate. As contact 18 moves clockwise a circuit is established, for example, through test tube 33, a substantially constant rate of alternating current flow passes through the electrolyte therein, and an alternating current voltage directly proportional to the resistance of the material in that test tube is imposed across leads 52 and 53 and upon the rectifier crystals 57 and 58. A direct current voltage, substantially double the voltage of that on either capacitor 59 or 60, is then imposed upon terminals 62 and 63 of the conventional recording means 55. This means, in turn, causes a record to be made rapidly and automatically upon chart 79 showing the calibrated resistance of the sample under measurement. As switch contact 18 continues to rotate, a series of such records is made and in a short time a remeasurement of the resistance of the same sample in test tube 33 and under the same conditions of temperature, current flow, capacitance and the like is made. With conventional recording means of the type above described a large number of separate measurements per minute can be made, with the result that an exceptionally accurate determination may now be had of the clotting time and rate of clot retraction of blood when employing this invention. Furthermore, since the invention permits the practice of an automatic process wherein no vibration or touching of the samples is entailed, the danger of acquiring erroneous readings as a result of manual connecting of leads or of the stray capacitance induced by a laboratory worker touching the circuit is eliminated. Other secondary but valuable advantages will also occur to those skilled in the art.

It is to be understood, moreover, that the invention is not limited solely to the treatment of this one material, but on the contrary is intended to be useful in measuring resistance of other electrolytes. Whereas it has especial value in connection with various electrolytes of biological origin such as whole blood, plasma, solutions containing blood cells and the like, it may also be used in connection with electrolytes of other origin wherein less stringent measuring requirements are indicated.

Accordingly, the invention is not intended to be limited to the embodiments as shown, but on the contrary is intended to cover such modifications and changes as are comprehended within the scope of the appended claims.

What is claimed is:

1. Resistance measuring apparatus comprising in combination, an electrical circuit having therein an electrolyte whose variable resistance is to be measured, a fixed resistance having a value of the order of one-hundred times the resistance of said electrolyte and connected in series with said electrolyte, constant voltage power supply means connected across said electrolyte-resistance combination and providing therewith an alternating current of substantially constant rate of current flow through said circuit, recording means adapted to receive a direct current voltage, a rectifier connected to said recording means, and switching means periodically electrically connecting said rectifier across said electrolyte whereby a direct current voltage proportional to the resistance of said electrolyte is periodically impressed upon said recorder.

2. Resistance measuring apparatus comprising in combination, an electrical circuit having therein in series a fixed resistance and an electrolyte whose variable resistance is to be measured, said fixed resistance having a value of the order of hundreds of times the value of said electrolytic resistance for providing an alternating current of substantially constant rate of current flow through said circuit, recording means adapted to receive a direct current voltage, a voltage-amplifying rectifier connected to said recording means, and periodically conducting switching means electrically connecting said rectifier across said electrolyte whereby said rectifier periodically impresses upon said recording means a direct current voltage proportional to the resistance of said electrolyte and said recording means records the variations in resistance of said electrolyte with time.

3. Resistance measuring apparatus comprising in combination, an electrical circuit having therein a fixed resistance and an electrolyte of biological origin whose variable resistance is to be measured, said fixed resistance having a resistance of the order of one hundred times the resistance of said electrolyte, means including a constant temperature liquid bath in which said electrolyte is separably immersed for maintaining said electrolyte at a desired temperature, means including said fixed resistance and electrolyte providing an alternating current of substantially constant rate of current flow through said circuit, recording means adapted to receive a direct current voltage, a crystal rectifier connected to said recording means, said rectifier being immersed in said constant temperature bath for maintaining said rectifier at the same constant temperature as said electrolyte, and a switch means adapted to be connected across the electrolyte under measurement and to said rectifier whereby an alternating current voltage representative of the resistance of said electrolyte is converted into a direct current voltage applied to said recording means.

4. Resistance measuring apparatus comprising in combination, an electrical circuit having therein a fixed resistance and a plurality of electrolytes whose variable resistances are to be measured with respect to time, the value of said resistance being at least one hundred times the resistance of each of said electrolytes, means providing an alternating current of substantially constant rate of current flow through said circuit and including said fixed resistance, recording means adapted to receive a direct current voltage, a rectifier connected to said recording means, and a rotatable switch means electrically connected between said electrolytes and said rectifier, said rotatable switch repeatedly connecting said rectifier across consecutive individual electrolytes and thereby consecutively impressing upon said recorder separate voltages proportional to the resistance of said electrolytes at definite time intervals.

5. Resistance measuring apparatus comprising in combination with an electrolyte whose resistance is to be measured, a resistor connected in series with said electrolyte and having a large resistance relative thereto, alternating current supply means connected across said series connected resistor and electrolyte and providing a current flow through said electrolyte of not more than 1.0 milliampere, and voltage measuring means connected across said electrolyte and indicating the voltage thereacross as a measure of the resistance thereof.

6. Apparatus for the measurement of the resistance of an electrolyte comprising a pair of electrical contacts separated by a predetermined amount of electrolyte, a resistor having a large resistance relative to the electrolytic resistance separating said electrical contacts and connected to one of said electrical contacts, a power source connected across said series-connected resistor and electrolytic resistance and providing an electrical current alternating at more than sixty cycles per second and having a maximum value of 1.0 milliampere flow through said electrolyte between said contacts, rectifier means, switching means periodically electrically connecting said rectifier means between said electrical contacts, and voltage recording means connected to said rectifier means and producing a record of the variation of resistance of said electrolyte with time.

7. Improved resistance measuring apparatus comprising in combination with an electrolyte whose resistance is to be measured, a resistor connected in series with said electrolyte, a constant voltage source connected across said serially-connected electrolyte and resistor, said resistor having a resistance of 100–1500 times the resistance of said electrolyte, whereby the current through said electrolyte is maintained substantially constant, and voltage measuring means connected across said electrolyte to indicate the resistance thereof.

HOWARD R. HEATH.

References Cited in the file of this patent

UNITED STATES PATENTS

| Number | Name | Date |
| --- | --- | --- |
| 1,860,397 | Slawinski | May 31, 1932 |
| 2,221,307 | Christie | Nov. 12, 1940 |
| 2,224,382 | Douty | Dec. 10, 1940 |
| 2,298,506 | Parker | Oct. 13, 1942 |
| 2,390,409 | Aiken | Dec. 4, 1945 |
| 2,422,873 | Wolfner | June 24, 1947 |
| 2,492,651 | McNamara | Dec. 27, 1949 |
| 2,565,501 | Ingram | Aug. 28, 1951 |